United States Patent [19]

Millray

[11] 4,144,917
[45] Mar. 20, 1979

[54] RESILIENT INSERT FOR TIRE INFLATOR

[75] Inventor: Robert Millray, Saugus, Calif.

[73] Assignee: Allied Chemical Corporation, Morris Township, N.J.

[21] Appl. No.: 824,476

[22] Filed: Aug. 15, 1977

Related U.S. Application Data

[60] Division of Ser. No. 757,543, Jan. 7, 1977, Pat. No. 4,062,287, which is a continuation of Ser. No. 554,790, Mar. 3, 1975, abandoned.

[51] Int. Cl.² .............................................. B65B 3/04
[52] U.S. Cl. .................................. 141/311 R; 141/392
[58] Field of Search ............... 141/382, 392, 38, 311, 141/46, 312, 346–362, 383–386; 102/39 R; 137/231; 152/415; 222/3; 285/95, 355, 345, 332.2, 332.3

[56] References Cited

U.S. PATENT DOCUMENTS

| 653,570 | 7/1900 | Eddy | 141/382 |
| 684,001 | 10/1901 | Smith | 141/382 |
| 703,010 | 6/1902 | Smith | 141/382 |

*Primary Examiner*—Houston S. Bell, Jr.
*Attorney, Agent, or Firm*—Roger H. Criss; Ernest D. Buff

[57] ABSTRACT

A nozzle for use with a light, portable, miniaturized tire inflator. A resilient insert in the well of the nozzle enables it to be connected directly to the metal thread of a tire valve either by mating the insert with the screw thread or by pushing the insert onto the screw thread. The resilient nature of the insert prevents cross threading of the nozzle with the screw thread. During the inflation of the tire, the inflating gas exerts a force on the insert, thus causing it to compress. Such compression enables the insert to hold the screw thread and to provide a seal during the transference of the inflating gas without requiring any mechanical assistance to maintain proper contact with the valve.

6 Claims, 4 Drawing Figures

RESILIENT INSERT FOR TIRE INFLATOR

This is a division, of application Ser. No. 757,543, filed Jan. 7, 1977, now U.S. Pat. No. 4,062,287 which in turn is a continuation of Ser. No. 554,790, filed Mar. 3, 1975, now abandoned.

BACKGROUND OF THE INVENTION

The invention relates to miniaturized apparatus for inflating a pneumatic tire, such as a tire used on an automobile, truck, bicycle or other vehicle. The apparatus is small enough to fit in a limited space, such as in a tire well for a deflated, space-saving tire in a trunk of an automobile or in a glove compartment of an automobile. The apparatus is light in weight, portable and can be carried or held in one hand by the user. The apparatus is adapted to be attached directly to a valve of a tire to inflate the tire. The inflating gas is derived solely from burning a pyrotechnic material, preferably a slow burning, compacted pyrotechnic material. The apparatus does not use a stored fluid of any type, neither a compressed nor a liquefied gas.

U.S. Pat. No. 1,008,646 to Kassner, issued in 1911, discloses an apparatus for inflating a tire which is transportable, but not miniaturized and which uses celluloid to generate a gas upon burning. The device of the Kassner patent is not attached directly to the tire valve. Modern tire inflation apparatus have heretofore depended upon a stored fluid, either compressed gas or liquefied gas, rather than a gas generated by burning a pyrotechnic material, as illustrated in U.S. Pat. Nos. 3,448,779 and 3,513,885 to Horwitt; 2,498,596 to Wallace; and 2,218,931 to Carlson. The use of a comparatively faster-burning pyrotechnic material to inflate a vehicle safety bag, without the use of a stored gas, is disclosed in U.S. Pat. Nos. 3,618,980 and 3,618,981 to Leising; and in U.S. patent application Ser. No. 316,947, filed Dec. 20, 1972 which is a continuation of U.S. patent application Ser. No. 110,845, filed Jan. 29, 1971, both entitled "Gas Generator," both filed in the name of John J. Sack and Thomas E. Lohr, and both having a common assignee with the present invention.

U.S. patent application Ser. No. 520,506 filed Nov. 4, 1974, in the name of E. Garner and B. Hamilton, and having a common assignee with the present application, discloses a tire inflator of the type disclosed in this application, but which does not include the resilient insert such as a rubber or plastic embodiment to be described in detail hereinafter.

SUMMARY OF THE INVENTION

The invention is a nozzle for use with a light, portable, miniaturized tire inflator adapted to fit in a limited space, such as in a tire well for a deflated, space-saving tire in a trunk of an automobile, and adapted to be carried or held in one hand. The tire inflator includes a metal, preferably steel pressure cannister comprising in one embodiment a pressure vessel and a pressure head cap assembly, a pyrotechnic material in the pressure vessel, an ignitor mechanism and a nozzle in the head cap assembly, and an internal insulation liner for said pressure cannister to reduce the temperature level of the cannister to a level acceptable to an external insulation, such as plastic foam or paper, of about 350° F. The pressure vessel has a tire end and an ignitor end. The nozzle is mounted on the tire end of the pressure vessel in the pressure head cap assembly. The nozzle is adapted to be connected directly to a valve of the tire. An internal insulation liner is located on the interior surface of the cannister (preferably to both the pressure vessel and the head cap assembly in the embodiment mentioned). A resilient insert, for example rubber or plastic, in the nozzle end mates and threads in one embodiment, with the metal tire valve threads, and prevents cross threading, while providing a seal with the tire valve for inflation of the tire. The rubber insert also allows the tire inflator alternately simply to be pushed on the valve and form the required seal rather than threaded thereto, due to the resilient nature of the rubber.

DETAILED DESCRIPTION

Figure 1:
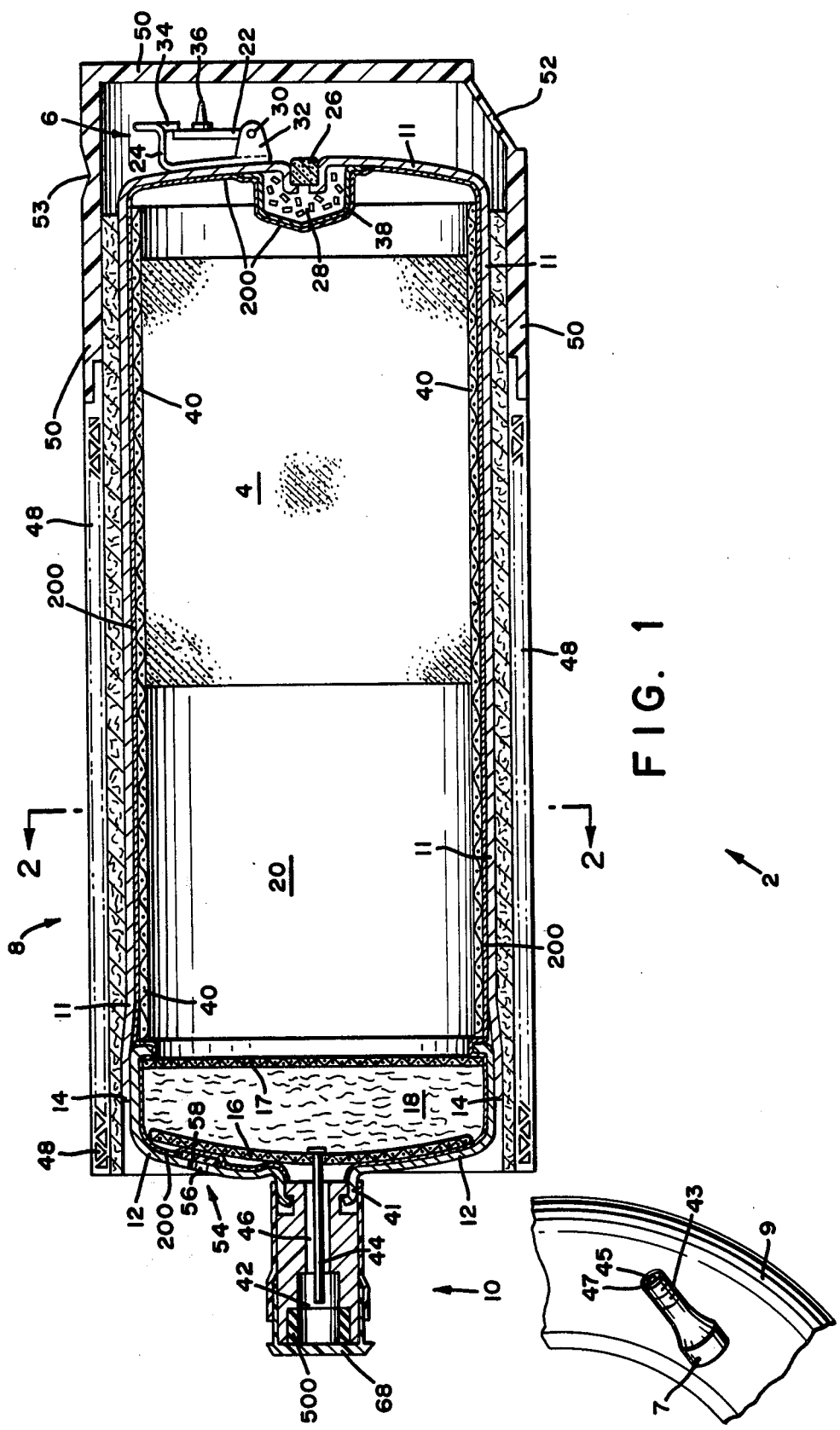
FIG. 1 is a cross-sectional view of a first embodiment of the tire inflator apparatus of this invention and a portion of a tire, including a tire valve, to be inflated by the tire inflator apparatus.
Figure 2:
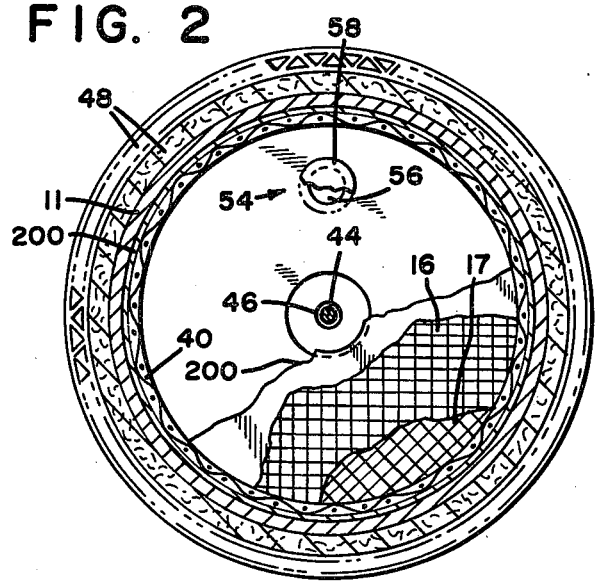
FIG. 2 is an end view of FIG. 1 in the direction of arrow A in FIG. 1.
Figure 3:
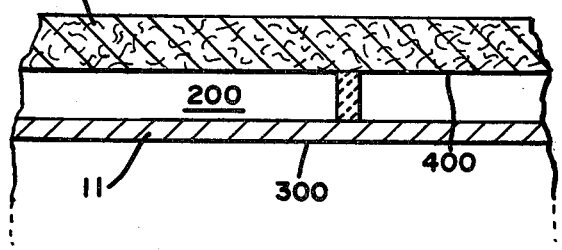
FIG. 3 is a detail of the wall structure with the air liner embodiment.
Figure 4:
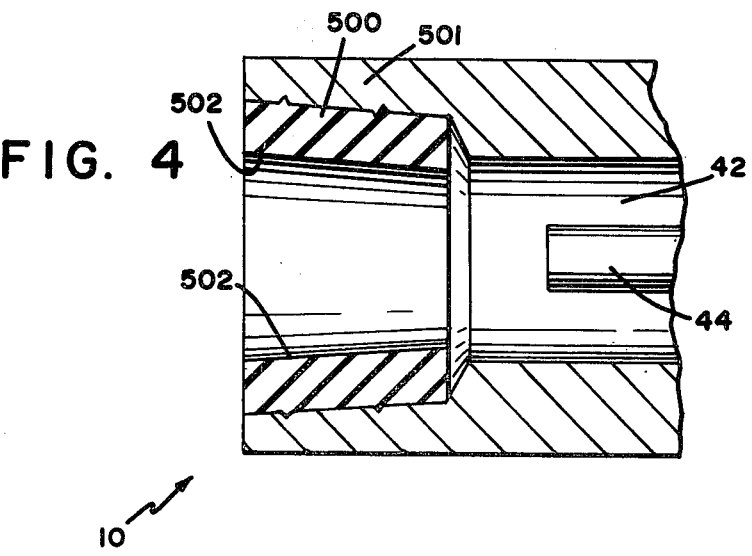
FIG. 4 is a detailed showing of a preferred embodiment of the insert structure.

The invention is a light portable, miniaturized tire inflator, the embodiment shown of which is referred to generally by the numeral 2. The embodiment 2 of the tire inflator includes: a pyrotechnic material 4, an ignitor mechanism, referred to generally by the numeral 6; which may be at either end of the pressure vessel 8 but is shown at the end opposite the nozzle 10, a pressure vessel, referred to generally by the numeral 8; and a nozzle, referred to generally by the numeral 10. A description of the tire inflator can be found in the aforementioned U.S. Pat. No. 4,062,287. The nozzle 10 is mounted on the tire end of the pressure vessel 8, at the opposite end of the pressure vessel 8 from the ignitor mechanism 6. The nozzle 10 is adapted to be connected directly to an inlet valve 7 of a tire 9 to inflate the tire 9. The term "directly" means that the nozzle 10 may be connected to a tire valve 7 without any need for a hose or tube between the nozzle 10 and the tire valve 7. For example, the nozzle 10 may be screwed on the tire valve 7 or pushed thereon as will be described hereafter.

The nozzle 10 has a tire end and a pyrotechnic end. The pyrotechnic end of the nozzle 10 is connected to a mouth 41 of the cannister cap 12. The tire end of the nozzle 10 has a resilient insert 500, preferably rubber or resilient plastic for mating with the metal screw threads 43 of the tire valve, or for being pushed thereon. The tire end of the nozzle 10 has a well 42. The tire end of the nozzle 10 is adapted to fit over and around the outer circumference of tire valve 7. The well 42 is dimensioned so that the tire valve 7 fits into the well 42. The insert 500 is located in the well 42 on the inside walls of the nozzle 10. In a preferred embodiment the wall 501 of the nozzle is spun over the insert. The inside surface 502 of the insert 500 is tapered for reception of the valve, and retention of the valve in the insert in a sealed relationship, either by mating it with the screw thread or pushing it thereon, causes the insert to compress when a removal force is exerted. Rubber is preferred for the insert material, and it permits misalignment of the unit when installed in the tire valve, and the resultant cross threading. The nozzle 10 also includes an optional stem depressor 44 for depressing the valve stem 45 of the tire valve 7 to allow inflating gas to pass through the tire valve 7 into the tire 9. The stem depressor 44 is a stationary pin which extends through a nozzle bore 46 in the pyrotechnic end of the nozzle 10. The nozzle bore 46 extends from the pyrotechnic end of the nozzle 10 to the well 42 of the nozzle 10. The nozzle bore 46 conducts inflating gas from the pressure vessel 8 around the stem depressor 44 at the well 42. The stem depressor 44 is fixedly attached to the slotted plate 16.

In operation, the user removes the safety cap 50, attaches the nozzle 10 to the tire valve 7 to depress the valve stem 45 and depresses the catch 34. This releases the striker 22 which hits the primer 26. This ignites the ignitor mix 28 which causes the pyrotechnic material 4 to burn. The inflating gas generated upon combustion passes through the metal screen 40, in contact with liner to the plenum chamber 20, the coolant bed 18, the nozzle bore 46, the well 42, and the tire valve 7 and into the tire 9.

We claim:

1. A nozzle adapted for connection to the metal threaded part of a tire valve, which comprises:
   (a) a well dimensioned to enable said valve to be inserted therein;
   (b) an end adapted for attachment to a pressure reservoir;
   (c) means for transferring inflating gas from said pressure reservoir to said well; and
   (d) a flexible insert mounted in said well, said insert being adapted to connect directly to said metal thread either by mating said insert with the screw thread or by pushing said insert thereon, said insert being adapted to hold said metal thread and to seal said nozzle to said valve during transference of inflating gas from said pressure reservoir to the tire.

2. A nozzle as recited in claim 1, wherein said insert is rubber.

3. A nozzle as recited in claim 1, wherein said insert is tapered for reception of said threaded part.

4. A nozzle as recited in claim 1, wherein said insert is spin mounted with said nozzle.

5. A nozzle adapted for connection to the metal threaded part of a tire valve having a stem, which comprises:
   (a) a well tapered and dimensioned to enable said tire valve to be inserted therein;
   (b) an end adapted for attachment to the mouth of a pressure reservoir;
   (c) a bore for transferring inflating gas from said mouth to said well;
   (d) a flexible, tapered insert mounted in said well, said insert being adapted to connect directly to said metal thread either by mating said insert with the screw thread or by pushing said insert thereon, said insert being adapted to hold said metal thread and to seal said nozzle to said valve during transference of inflating gas from said pressure reservoir to the tire; and
   (e) a stem depressor comprising a stationary pin fixedly attached to said pressure reservoir and extending through said well, for depressing said valve stem of said valve to allow inflating gas to pass through said valve into the tire.

6. A nozzle as recited in claim 1, wherein said means for transferring inflating gas is a bore.

* * * * *